United States Patent [19]

Handler et al.

[11] 4,197,775
[45] Apr. 15, 1980

[54] SAW TABLE

[75] Inventors: Milton E. Handler, Northbrook; Richard Sylvan, Glenview; Herbert Baisch, Niles, all of Ill.

[73] Assignee: Hirsh Company, Skokie, Ill.

[21] Appl. No.: 947,762

[22] Filed: Oct. 2, 1978

[51] Int. Cl.² ............................................. B27B 5/20
[52] U.S. Cl. ............................. 83/471.3; 83/117; 83/477.1; 83/489
[58] Field of Search ............... 83/117, 118, 452, 389, 83/471.3, 471.2, 477.1, 484, 489, 574

[56] References Cited

U.S. PATENT DOCUMENTS

| | | | |
|---|---|---|---|
| 2,630,147 | 3/1953 | Garberg | 83/471.3 |
| 2,903,026 | 9/1959 | Frydenlund | 83/471.3 X |
| 3,296,911 | 1/1967 | McLane | 83/408 |
| 3,734,151 | 5/1973 | Skripsky | 144/286 R |
| 4,007,657 | 2/1977 | Burch | 83/471.3 |
| 4,133,237 | 1/1979 | Lewin | 83/471.3 X |

FOREIGN PATENT DOCUMENTS

783112 9/1957 United Kingdom ................. 83/471.2

*Primary Examiner*—J. M. Meister
*Attorney, Agent, or Firm*—Dressler, Goldsmith, Shore, Sutker & Milnamow, Ltd.

[57] ABSTRACT

An improved, safer, more efficient saw table construction is provided in the present invention by channelled guide tracks which slidably support a tool and plate assembly in any one of two positions at right angles to each other. The tool can be readily moved from one position to another, without remounting the tool on the tool plate, by controllable withdrawal of the tool plate from the ends of the guide tracks, rotation of the entire tool and plate assembly, and reinsertion of the plate into the channelled tracks provided.

4 Claims, 9 Drawing Figures

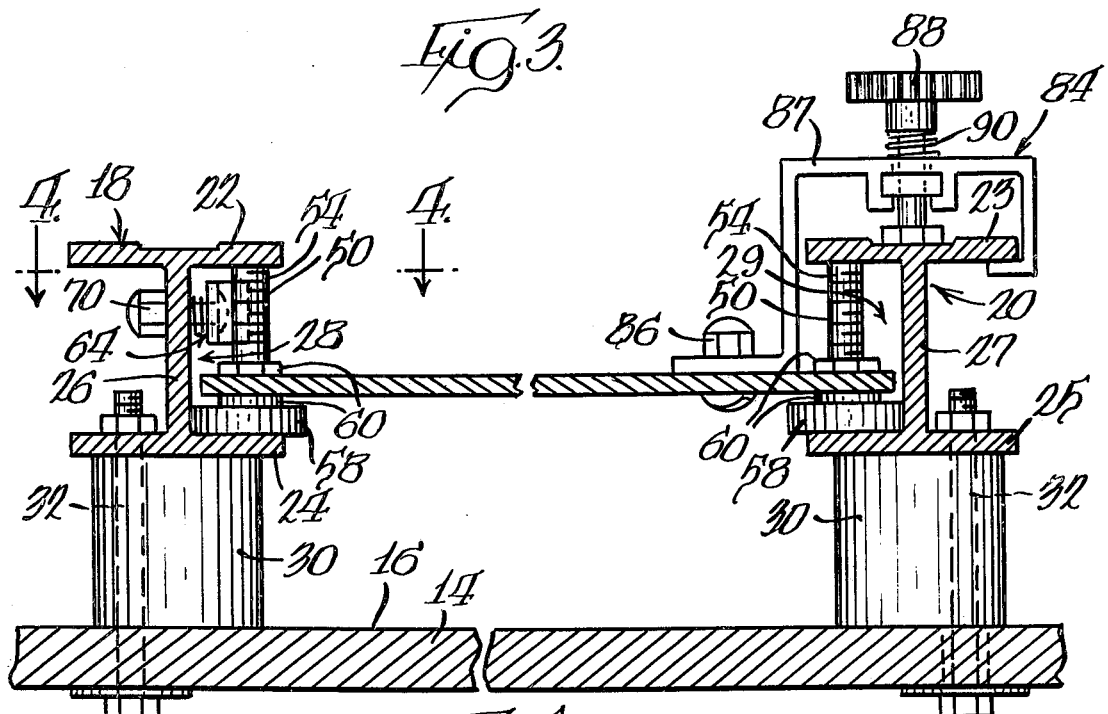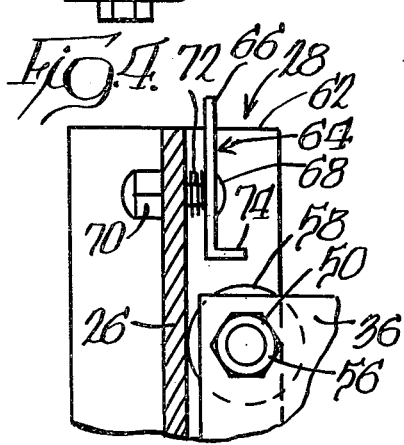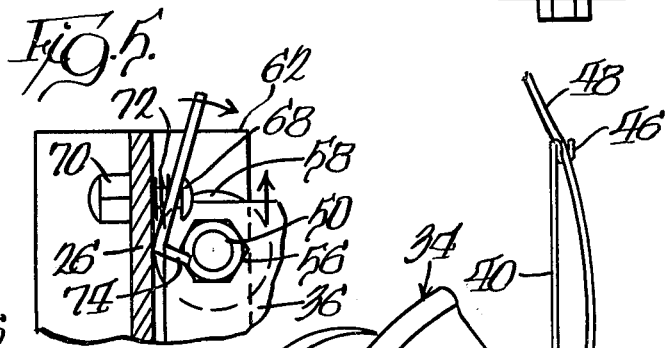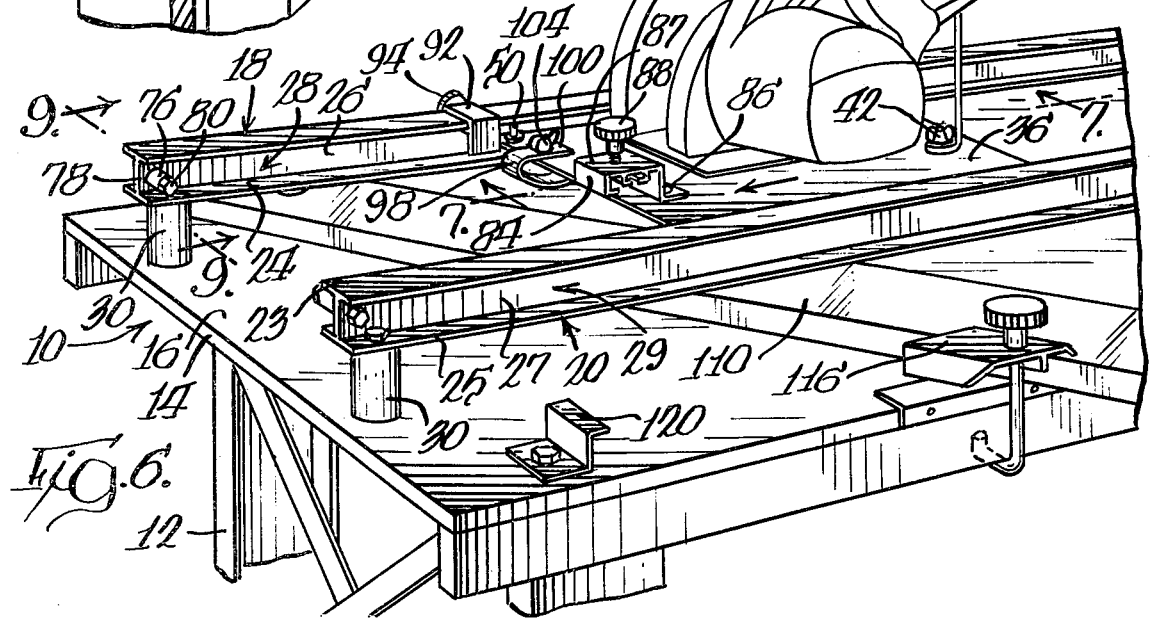

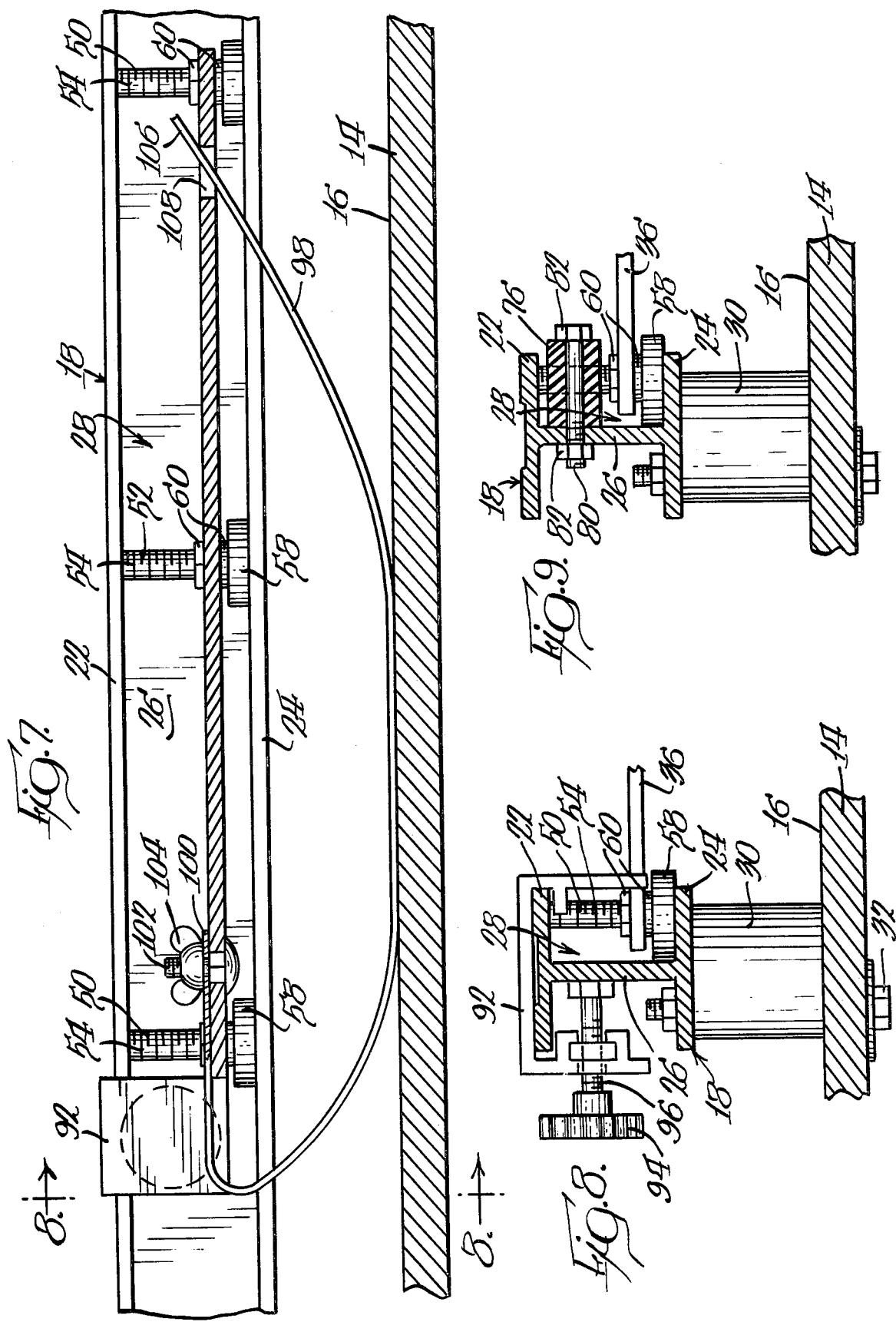

SAW TABLE

BACKGROUND OF THE INVENTION

This invention relates to an improved saw table for accommodating a standard portable power tool, such as a circular saw or router, in any one of two positions at right angles to each other which may be desired for various operations, such as cross-cutting and rip-cutting operations of a circular saw. The present invention provides an improved, safer construction of a saw table in that the power tool may be moved from one position to another without remounting the tool by withdrawing the tool support plate assembly from the ends of channelled guide tracks.

The saw table of the present invention accommodates a portable circular saw on a square tool plate which is slidably mounted in channels of a pair of spaced, parallel I-beam shaped guide tracks supported on a work engaging base. Precision cuts may be made in a workpiece in either a cross-cutting or rip-cutting operation without requiring any remounting or resetting of the saw on the tool plate. Consisting of relatively few and inexpensive parts, the saw table of the present invention has built-in safety features not found in prior art units to reduce the possibility of a power tool becoming accidentally detached from the saw table.

The I-beam structure of the guide tracks provides a rigid structure and also protects against the hazards which may result when a saw blade is pinched by the kerf cut in a workpiece causing the saw to kick back at the operator, while still permitting the saw to be freely moved parallel to, and withdrawn from, the tracks of the saw table without requiring clumsy clamping operations. To move a mounted saw between crosscut and ripcut positions, an operator merely slides the tool plate beyond the ends of the tracks, rotates the tool plate-saw structure ninety degrees, and reinserts the tool plate in the channels of the track in the desired position. A releasable stop is provided to prevent accidental withdrawal of the tool plate from the guiding channels of the track.

Other advantages and features of the present invention will be apparent from the following detailed description of a preferred embodiment of the invention, from the claims and from the accompanying drawings in which each and every detail shown is fully and completely disclosed as a part of this specification in which like numerals refer to like parts.

BRIEF DESCRIPTION OF THE DRAWINGS

FIG. 3 is a cross-sectional view of the saw table taken substantially along line 3—3 of FIG. 2;

FIG. 4 is a partial plan view of one end of one of the tracks of the saw table taken substantially along line 4—4 of FIG. 3 showing the releasable stop in a stopping position;

FIG. 5 is a partial plan view similar to FIG. 4 showing the releasable stop actuated to a withdrawal position;

FIG. 6 is a partial perspective view of the saw table;

FIG. 7 is a partial side elevation view of the saw table taken substantially along line 7—7 of FIG. 6 showing the hold-down spring feature of the resent invention;

FIG. 8 is a partial cross-sectional view of one of the tracks of the saw table taken substantially along line 8—8 of FIG. 7 illustrating the adjustable stop clamp of the present invention; and FIG. 9 is a partial cross-sectional view of one of the tracks of the saw table taken substantially along line 9—9 of FIG. 6 showing the bumper stop of the saw table.

DETAILED DESCRIPTION OF ILLUSTRATIVE EMBODIMENT

Figure 1:
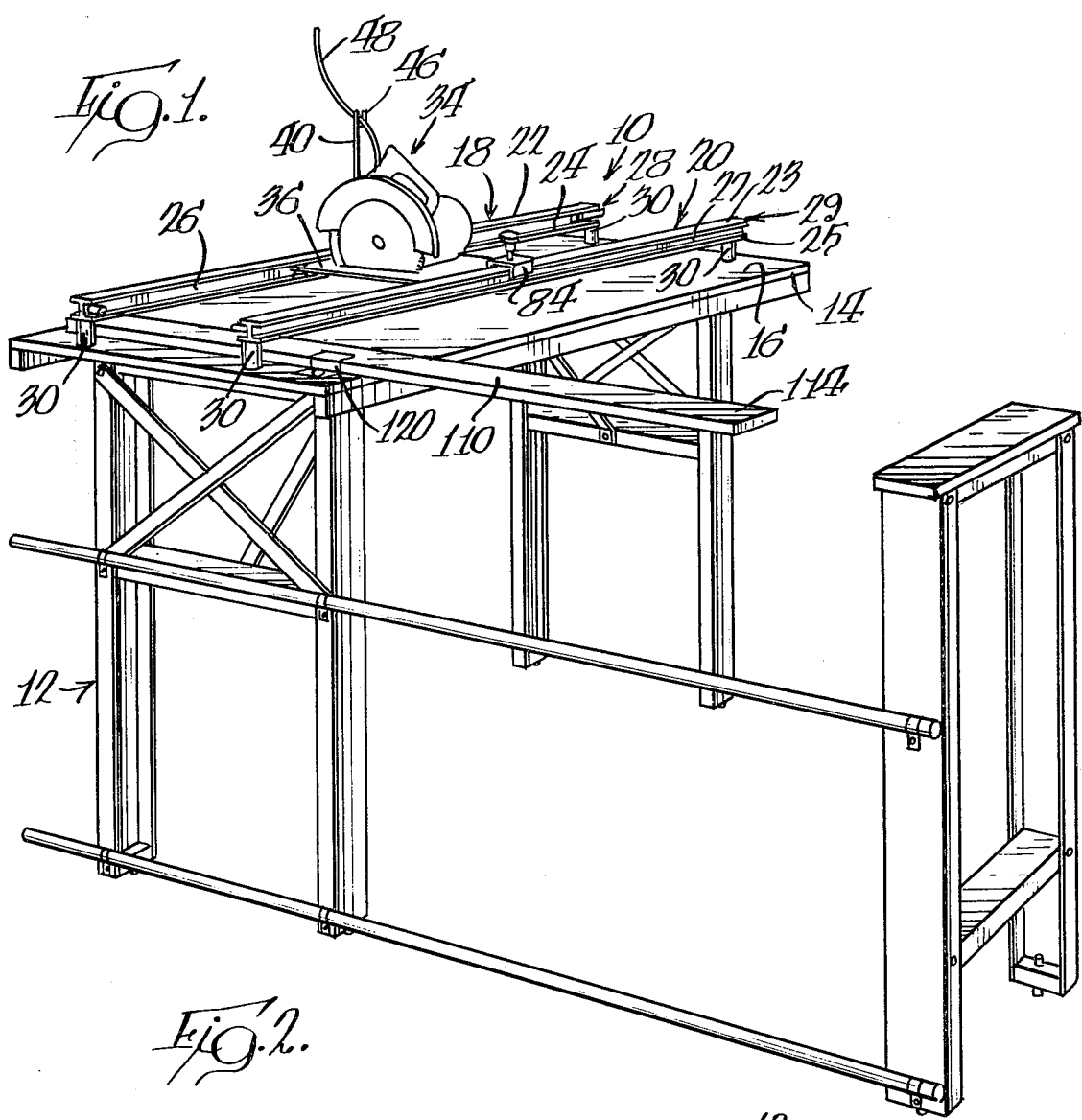
FIG. 1 is a perspective view of a saw table in accordance with the principles of the present invention mounted on a supporting structure.

FIG. 1 illustrates a saw table 10 which for illustrative purposes includes a suitable supporting structure 12.

As best shown in FIG. 6 a horizontal workpiece support platform 14 includes a wooden upper flat surface 16 that supports a pair of elongated, parallel, spaced apart guide tracks 18 and 20 having I-beam cross sections. The I-beam shape of tracks 18 and 20 defines channels in which a tool mounted on a tool plate assembly (described below) is slidably supported. Track 18 has upper flange 22, lower flange 24 and vertical side 26 defining a first channel 28, and track 20 has upper flange 23, lower flange 25 and vertical side 27 defining a second channel 29 facing first channel 28. To support tracks 18 and 20 above upper flat surface 16 of platform 14, cylindrical spacers 30 are positioned proximate to the opposite ends of tracks 18 and 20. Spacers 30 are anchored to base 14 by bolts 32 (FIG. 3) which pass through spacers 30 and lower flanges 24 and 25 of tracks 18 and 20, respectively. To position tracks 18 and 20 at different heights above upper flat surface 16 of platform 14, spacers 30 of various heights may be used.

A portable electric saw 34 of the usual type or similar power tool, such as a router (not shown), is demountably attached on a square shaped tool plate 36 by suitable fastening means (not shown) adapted to securely fasten saw 34 to tool plate 36. To keep this cord of saw 34 in a convenient, non-obstructive position during operation, cord holder 40 is provided. Cord holder 40 extends upwardly from tool plate 36 and is fastened to tool plate 36 by wingnut assembly 42 extending through a cord aperture on tool plate 36. The upper end of cord holder 40 has integrally formed therewith U-shaped member 46 for holding cord 48 of saw 34 in a convenient non-obstructive position. Tool plate 36 also includes a slot (not shown) through which the saw blade of saw 34 or similar work engaging element of a similar power tool projects.

Preferably, upper flat surface 16 of support 14 is provided with a pre-machined groove (not shown) parallel to tracks 18 and 20 below the saw blade of saw 34 to receive the peripheral edge of the saw blade which extends slightly below the upper flat surface 16 of support 14 in order to completely cut through an article being crosscut. Though upper flat surface 16 of support 14 is not provided with a pre-machined groove for accommodating rip-cutting operations, it is to be understood that the operator may make any number of grooves in the wooden upper flat surface 16, perpendicular to tracks 18 and 20, as may be required preliminary to rip-cutting operations.

Tool plate 36 is slidably mounted for longitudinal movement parallel to tracks 18 and 20 in first and second channels 28 and 29 of tracks 18 and 20, respectively, by nylon bearing members, or guide members, 50 and 52. As best shown in FIG. 3, bearing members 50 and 52 each has a generally upstanding cylindrical upper surface 54 which projects through receiving apertures (not shown) on tool plate 36, above tool plate 36 and a generally cylindrical lower surface 58, wider in diameter than said upper surface, disposed below tool plate 36. So that no rotational movement of bearings 50 and 52 occurs when tool plate 36 is moved along tracks 18 and 20, securing nuts 60 fasten bearing members 50 and 52 to tool plate 36. Bearing members 50 and 52 have a height substantially equal to the distance between upper flanges 22 and 23 and lower flanges 24 and 25 of channels 18 and 20 respectively. Lower surface 58 of bearing members 50 and 52 preferably has a diameter slightly larger than the width of lower flanges 24 and 25. To maintain accurate alignment of plate 36 within the channels, bearing members 50 and 52 may be manually rotated by loosening securing nuts 60 when the edges of bearing members 50 and 52 in contact with vertical sides 26 and 27 of channels 28 and 29 become worn.

So that the lower surface 58 of bearing members 50 project outwardly of both adjacent edges forming each corner of tool plate 36, bearing members 50 and associated receiving apertures in tool plate 36 are positioned proximate to the four corners of tool plate 36. Bearing members 50 are thus adapted to support tool plate 36 in any one of two positions at right angles to each other. As shown in FIG. 6, bearing members 50 slidably support tool plate 36 for a cross-cutting operation of a workpiece (not shown) inserted between tracks 18 and 20 and upper flat surface 16 of support 14. As shown in FIGS. 1 and 3, bearing members 50 support tool plate 36 for a rip-cutting operation of a workpiece. In the preferred embodiment bearing members 52 are spaced between bearing members 50 on two opposite sides of tool plate 36 for additional support of tool plate 36 during a sliding cross-cutting operation and to permit partial withdrawal of tool plate 36 from channels 28 and 29 as described below.

To adjust saw 34 between cross-cut and rip-cut operating positions, an operator need only slide tool plate 36 parallel to tracks 18 and 20, slidably withdraw tool plate 36 out of channels 28 and 29 at track ends 62 and 63, respectively, rotate tool plate 36 to the desired position, and reinsert tool plate 36 and bearing member 50 into channels 28 and 29 at track ends 62 and 63.

To prevent unintentional withdrawal of tool plate 36 from channels 28 and 29 an L-shaped releasable stop 64 is positioned in channel 28 of track 18 at track end 62 as shown in FIGS. 4 and 5. Leg 66 of releasable stop 64 is pivotally secured to vertical side 26 of track 18 in a normally parallel relation to track 18 proximate to track end 62 by bolt 68 and nut 70. A compressing spring 72 is wound around bolt 68 between leg 66 of releasable stop 64 and vertical side 26 of track 18 to bias leg 66 in a position normally parallel to track 18. Flange 74 of releasable stop 64 at the end of leg 66 inside channel 28 acts as a barrier to bearing members 50 and 52 positioned in channel 28 of track 18 and prevents withdrawal of tool plate 36 out of channels 28 and 29. The unflanged end of releasable stop 64 projects outwardly of track end 62. To withdraw bearing members 50 and 52 and tool plate 36 (or part of tool plate 36) out of channels 28 and 29, the unflanged end of releasable stop 64 is manually pushed in a direction generally toward track 20 and tool plate 36 is slid beyond track ends 62 and 63. Bearing members 52 intermediate corner bearing members 50 can stabilize tool plate 36 when two corner bearing members 50 are withdrawn beyond track ends 62 and 63 so as to accommodate a larger workpiece. In this manner, the saw table 10 may accommodate workpieces several inches larger than would otherwise be possible absent intermediate bearing members 52. Compression spring 72 returns leg 66 of releasable stop 64 to a normal barrier position when unflanged end of leg 66 of releasable stop 64 is released.

To prevent tool plate 36 from being withdrawn from the other end of tracks 18 and 20, a generally cylindrical bumper stop 76 is secured to vertical side 26 of track 18 proximate to the end of track 18 opposite track end 62. Referring to FIG. 9, bumper stop 76 is fastened to vertical side 26 of track 18 by bolt 80 and nuts 82 so as to prevent bearing members 50, and thus tool plate 36, from being withdrawn from channels 28 and 29 anywhere except track ends 62 and 63.

The interrelationship of channels 28 and 29, releasable stop 64 and bumper stop 76 is a preferred embodiment of the present invention. Essentially, the upper flanges 22 and 23 of tracks 18 and 20 prevent vertical movement of saw 34 or similar tool during operation of the tool and releasable stop 64 and bumper stop 76 insure that saw 34 and tool plate 36 cannot be accidentally withdrawn from channels 28 and 29 and thus create a serious risk of injury to an operator or damage to the tool.

To selectively secure tool plate 36 in an immovable position which may, for example, be desired for a rip-cutting operation, a rip clamp 84 is bolted as at 86 to upper flat surface 16 of support 14 proximate one edge of tool plate 36 not having an intermediate bearing member 52. As shown in the right-hand side of FIG. 3, rip clamp 84 is generally C-shaped and adapted to be slidably positioned around the upper portion of track 20 (or track 18, depending on the direction of tool plate 36) when tool plate 36 is inserted in channels 28 and 29 at track ends 62 and 63. A turn knob 88 is supported on rip clamp 84 above track 20 (or 18) to tighten a screw 90 which exerts pressure against bearing members 50 to immobilize tool plate 36 in a desired position.

To prevent movement of tool plate 36 beyond a desired position in one direction, a stop clamp 92 (FIG. 6) is slidably mounted on track 18 (or 20). As shown in FIG. 8, stop clamp 92 is generally C-shaped and adapted to be slidably positioned around the upper portion of track 18 (or 20). A turn knob 94 and screw 96 arrangement similar to that used in rip clamp 84 is supported on stop clamp 92 on the vertical flanged side of stop clamp 92 exterior of the space between tracks 18 and 20 so as to exert pressure on vertical side 26 (or 27) of track 18 (or 20) to immobilize stop clamp 92 in a desired position and form a barrier to bearing members 50 and tool plate 36 preventing movement past the selected position in one direction.

For preventing upward movement of a workpiece during operation of saw 34 or a similar tool, a flexible metallic, hold-down spring 98 is provided. Hold-down spring 98 has a fixed end 100 secured to the upper surface of tool plate 36 by a bolt 102 and wingnut 104. Hold-down spring 98 is bent around one edge of tool plate 36 and maintained in an adjustable, pressure exerting position below tool plate 36 by free end 106 of hold-down spring 98 which is extended through tool plate 36 at aperture 108 above tool plate 36 as shown in FIG. 7.

Figure 2:
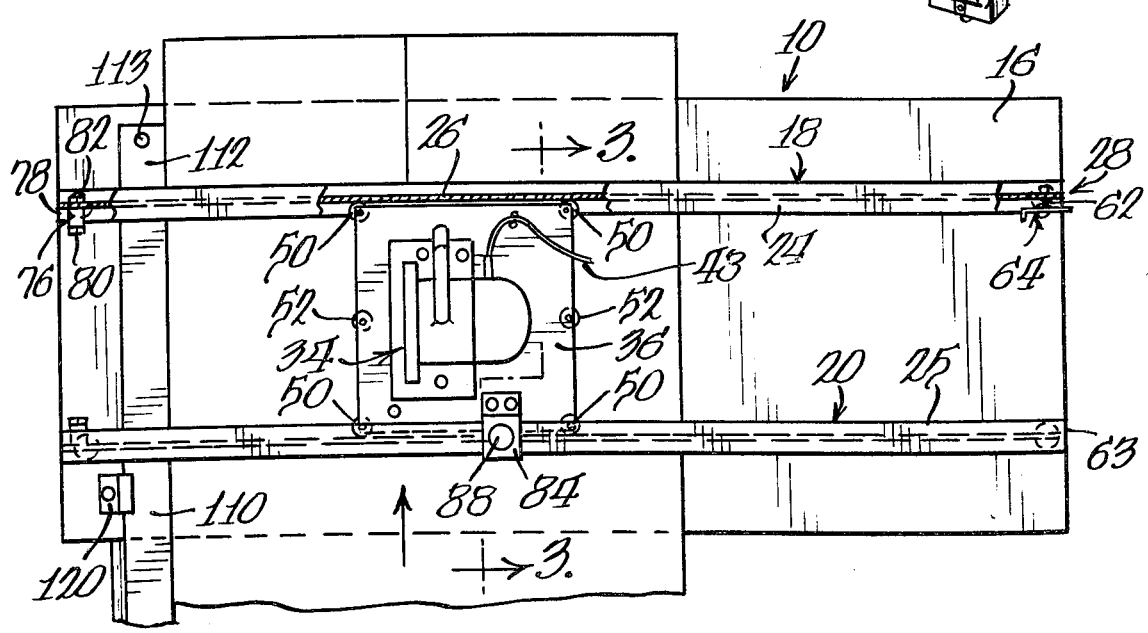
FIG. 2 is a plan view of the saw table.

Saw table 10 has a pivotable workpiece guide or fence 110 (FIG. 2) for use as a guide against which a workpiece is placed for either rip-cutting or cross-cutting operations. Fence 110 is adjustable to allow a workpiece to be cut at an angle. Fence 110 is an elongated rectangular wood member having a fixed end 112 pivotally mounted to upper flat surface 16 of support 14 exterior of the space between tracks 18 and 20 about fence pivot point 113 and extends across the width of support 14 below tracks 18 and 20. Movable end 114 of fence 110 extends beyond tracks 18 and 20 to the side of support 14 opposite fixed end 112. At this side of support 14 a fence angle guide is mounted to support 14 (FIG. 6). A fence clamp 116 having a generally J-shaped stem 118 extending around the side of support 14 is provided for securing fence 110 at a desired angle with respect to tracks 18 and 20. Fence 110 is further secured when in a position at right angles to tracks 18 and 20 by fence stop 120 secured to the upper flat surface 16 of support 14.

Thus, it is seen that fence 110 may be fixed at two points at any selected angle setting. This provides a non-yielding, positively engaged workpiece guide which cannot be accidentally moved from the predetermined setting by forces transmitted to fence 110 by a workpiece during the sawing operation.

While this invention is susceptible of embodiment in many different forms, there is shown in the drawings and described above a preferred embodiment of the invention with the understanding that the present disclosure is to be considered as an exemplification of the principles of the invention and is not intended to limit the invention to the embodiments illustrated.

We claim:

1. A saw table for portable power saws and like tools comprising:
    a support having an upper flat surface upon which a workpiece may be supported;
    a square tool plate assembly adapted to support said saw or similar tool;
    a pair of elongated parallel tracks supported on said upper flat surface of said base, each of said tracks having ends and generally horizontally spaced longitudinally extending flanges extending between said ends, said flanges defining a channel therebetween in which said tool plate assembly is slidably supported for movement parallel to said tracks, said tracks spaced apart from each other to define an opening therebetween substantially equal in width to the width of said tool plate assembly whereby said tool plate assembly may be moved into and out of slidable engagement with said channels of said tracks and rotatable between two positions at right angles to each other by sliding said tool plate assembly beyond said ends of said tracks, rotating said tool plate assembly to the desired position and reinserting said tool plate assembly into said channels at said ends of said tracks;
    slidable guide members mounted on said tool plate assembly for slidably supporting said tool plate assembly for movement within said channels parallel to said tracks in any one of said two positions at right angles to each other, and
    a releasable stop member mounted within said channel of at least one of said tracks adjacent at least one of said ends of said track, comprising an L-shaped lever, mounting means for pivotally mounting said lever in said channel, and spring means for biasing said lever to a normally closed position to restrain withdrawal of said guide members from said channels.

2. A saw table for portable power saws and like tools comprising:
    a support having an upper flat surface upon which a workpiece may be supported;
    a square tool plate assembly adapted to support said saw or similar tool;
    a pair of elongated parallel tracks supported on said upper flat surface of said base, each of said tracks having ends and generally horizontally spaced longitudinally extending flanges extending between said ends, said flanges defining a channel therebetween in which said tool plate assembly is slidably supported for movement parallel to said tracks, said tracks spaced apart from each other to define an opening therebetween substantially equal in width to the width of said tool plate assembly whereby said tool plate assembly may be moved into and out of slidable engagement with said channels of said tracks and rotatable between two positions at right angles to each other by sliding said tool plate assembly beyond said ends of said tracks, rotating said tool plate assembly to the desired position and reinserting said tool plate assembly into said channels at said ends of said tracks;
    slidable guide members comprising nylon bearings mounted on said tool plate assembly for slidably supporting said tool plate assembly for movement within said channels parallel to said tracks in any one of said two positions at right angles to each other; and
    said nylon bearings having an upper cylindrical surface extending above said tool plate assembly and having a lower cylindrical surface wider in diameter than said upper cylindrical surface, said lower cylindrical surface being disposed below said tool plate assembly.

3. A saw table as set forth in claim 2 wherein said guide members have a height substantially equal to the distance between the flanges of said tracks.

4. A saw table as set forth in claim 2 wherein three of said guide members are positioned along each of two opposite edges of said tool plate assembly with one said guide member positioned adjacent each of the corners of said tool plate and having its lower cylindrical surface extending outwardly of both of the edges of said tool plate assembly defining each corner for slidably supporting said tool plate assembly in any one of two of said positions at right angles to each other, and another said guide member intermediate said corner guide members on each of two opposite edges of said tool plate assembly.

* * * * *